United States Patent
Roeber et al.

(10) Patent No.: US 8,328,222 B1
(45) Date of Patent: Dec. 11, 2012

(54) DYNAMIC ANTI-SWAY, TONGUE WEIGHT-EQUALIZING TRAILER HITCH

(75) Inventors: Leslie Roeber, Emerson, NE (US); Paul Choquette, Sergeant Bluff, IA (US)

(73) Assignee: Automatic Equipment Manufacting Company, Pender, NE (US)

( * ) Notice: Subject to any disclaimer, the term of this patent is extended or adjusted under 35 U.S.C. 154(b) by 149 days.

(21) Appl. No.: 12/925,901

(22) Filed: Nov. 2, 2010

(51) Int. Cl.
*B60D 1/00* (2006.01)

(52) U.S. Cl. ............. 280/455.1; 280/406.1; 280/405.1

(58) Field of Classification Search ............. 280/455.1, 280/405.1, 406.1
See application file for complete search history.

(56) References Cited

U.S. PATENT DOCUMENTS

| | | | |
|---|---|---|---|
| 3,021,154 A | 2/1962 | Hedgepeth | |
| 3,347,561 A | 10/1967 | Hedgepeth | |
| 3,441,291 A | 4/1969 | Morris, Jr. | |
| 3,445,125 A | 5/1969 | Stewart | |
| 3,679,231 A * | 7/1972 | Derr, Jr. | 280/406.2 |
| 3,679,232 A * | 7/1972 | Weber | 280/406.2 |
| 3,731,950 A | 5/1973 | Burcham | |
| 3,756,618 A | 9/1973 | Lewis | |
| 3,801,133 A | 4/1974 | Thompson | |
| 3,814,463 A | 6/1974 | Tunesi | |
| 3,900,212 A | 8/1975 | Ewing | |
| 4,033,601 A | 7/1977 | Lindahl et al. | |
| 4,053,174 A | 10/1977 | Guettler, Jr. | |
| 4,198,073 A | 4/1980 | Olsen | |
| 4,213,627 A | 7/1980 | Thompson | |
| 4,230,333 A | 10/1980 | Persyn | |
| 4,253,680 A | 3/1981 | Albright et al. | |
| 4,815,752 A | 3/1989 | Young et al. | |
| 5,375,867 A | 12/1994 | Kass et al. | |
| 5,465,991 A | 11/1995 | Kass et al. | |
| 5,562,298 A | 10/1996 | Kass et al. | |
| 5,580,076 A | 12/1996 | DeRoule et al. | |
| 5,628,525 A | 5/1997 | Kass et al. | |
| 5,725,231 A | 3/1998 | Buie | |
| 5,799,965 A * | 9/1998 | Kass et al. | 280/406.1 |
| 5,868,414 A | 2/1999 | McCoy et al. | |
| 5,873,594 A | 2/1999 | McCoy et al. | |
| 5,890,726 A | 4/1999 | McCoy et al. | |
| 5,984,341 A | 11/1999 | Kass et al. | |
| 6,045,147 A * | 4/2000 | Schmidt et al. | 280/406.1 |
| 6,189,972 B1 | 2/2001 | Ullrich et al. | |
| 6,419,257 B1 | 7/2002 | McCoy et al. | |
| 6,536,793 B2 | 3/2003 | Sargent | |
| 6,629,701 B1 | 10/2003 | Colibert | |
| 6,722,682 B2 | 4/2004 | Valliere et al. | |
| 6,860,501 B2 | 3/2005 | Schmidt et al. | |
| 7,025,370 B2 | 4/2006 | Anderson et al. | |
| 7,506,885 B2 | 3/2009 | Colibert | |
| 2003/0042703 A1 | 3/2003 | Valliere et al. | |

\* cited by examiner

*Primary Examiner* — James Kramer
*Assistant Examiner* — Michael Stabley
(74) *Attorney, Agent, or Firm* — Donald R. Schoonover

(57) ABSTRACT

An anti-sway, tongue-weight equalizing hitch for a trailer having a hitch ball socket; a shank structured for releasably connecting to a towing vehicle; a hitch head secured to the shank and having a longitudinal axis, a hitch ball with a tow axis on the longitudinal axis; an elevating mechanism for adjusting the relative elevations of the hitch head and the trailer tongue; a leveling mechanism for vertically-orienting the tow axis; right and left spring bars mounted to the hitch head to pivot about opposing right and left rearwardly-tilted stabilizing axes disposed in opposing vertically-oriented pivot axis planes spaced laterally and equidistantly outwardly from the longitudinal axis; and right and left suspension mechanisms tensionally suspending distal ends of the spring bars wherein distal ends thereof are normally spaced laterally and equidistantly outwardly from the respective vertical-oriented pivot axis planes in an equilibrium configuration.

4 Claims, 1 Drawing Sheet

DYNAMIC ANTI-SWAY, TONGUE WEIGHT-EQUALIZING TRAILER HITCH

BACKGROUND OF THE INVENTION

1. Field of the Invention

The present invention relates to trailer hitches and, more specifically without limitation, to weight-distributing trailer hitches.

2. Description of the Related Art

Trailers, such as flat-bed trailers, horse trailers, and the like are commonly towed behind a towing vehicle. Such trailers generally have a forwardly-extending tongue with a hitch ball socket that is pivotally securable to a hitch arrangement mounted on the rear end of the towing vehicle. A weight-distributing hitch generally includes a hitch head with a hitch ball mounted thereon to matingly receive a hitch ball socket of the trailer. If the force at which the hitch ball socket bears downwardly against the hitch ball is excessive, sometimes referred to as tongue weight, the trailer tends to sway back and forth as the trailer is being towed behind the towing vehicle even along straightaways, commonly referred to as "porpoising", which seriously jeopardizes the ability of the operator of the towing vehicle to reliably control steering and stability of the towing vehicle and the trailer, sometimes with disastrous results. Trailer swaying creates substantial discomfort and anxiety not only for the driver of the towing vehicle but also for drivers of oncoming, following, and passing vehicles as well as jeopardizes the safety of the contents of the trailer. Trailer sway arises from a variety of sources, such as crosswinds, rough and/or uneven road conditions, improper tongue weight without redistribution between the front wheels and rear wheels of the towing vehicle, etc. Trailer swaying can be described as simulated small alternating turns, first toward one side, then the other.

It is well known in the art that trailer sway may be partially reduced, but not eliminated, by distributing some of the tongue weight from the back wheels of the towing vehicle to the front wheels of the towing vehicle. Such tongue weight redistribution is typically accomplished by adjusting the tilt of the hitch ball in combination with adjusting the tension being applied to distal ends of opposing spring bars having proximal ends thereof pivotally secured to the hitch head.

Primary objectives of cooperatively adjusting the tilt of the hitch ball and the tensions in the spring bars include adjusting the hitch ball wherein the axis of the hitch ball is vertically-oriented, aligning the axis of the hitch ball socket of the trailer with the axis of the hitch ball of the weight-distributing hitch, leveling the elevation of the trailer tongue relative to the normal unloaded elevation of the hitch arrangement of the towing vehicle, and adjusting tensioning of the spring bars to more evenly distribute the tongue weight from the rear wheels of the towing vehicle to the front wheels of the towing vehicle.

Prior art weight-distributing trailer hitches utilize various mechanisms to adjust the orientation of the hitch ball axis and the elevation of the hitch ball. For example, U.S. Pat. No. 6,629,701 of Colibert, which disclosure is incorporated herein by reference in its entirety, includes a hitch head having a pair of shank mount plates and an adjustable hitch shank. Other prior art hitches utilize beveled cam discs to make tilting adjustments of the hitch ball; see, for example U.S. Pat. No. 3,801,133 of Thompson.

The proximal ends of the spring bars of prior art weight-distributing trailer hitches typically are journalled to pivot about opposing vertically-oriented axes spaced equidistantly and laterally outwardly relative to the hitch ball of the hitch head. Distal ends of the spring bars extend rearwardly along the right and left rails of the tongue of the trailer. A left lifting mechanism tensionally connects the distal end of the left spring bar to the left tongue rail of the trailer, and a right lifting mechanism tensionally connects the distal end of the right spring bar to the right tongue rail of the trailer.

The lifting mechanisms are spaced above the distal ends of the spring bars and apply upward tensioning to the distal ends of the spring bars to accomplish the desired weight-distribution of the tongue weight. As a turn to the left or a trailer sway toward the left occurs, the hitch ball socket of the trailer pivots clockwise relative to the hitch ball of the weight-distributing hitch. Simultaneously therewith, the lateral offsetting of the vertically-oriented pivot axes of the proximal ends of the spring bars causes the distal end of the right spring bar to be displaced forwardly with the result that the lower end of the tensioning chain on the outside of the sway is spaced forwardly from the upper end of the right tensioning chain, and causes the distal end of the left spring bar to be displaced rearwardly with the result that the lower end of the tensioning chain on the inside of the sway is spaced rearwardly from the upper end of the left tensioning chain. Any change in the horizontal component of the tension in the right chain arising from the sway to the left would be substantially equal and opposite to the change in the horizontal component of the tension in the left chain arising from the left sway. In other words, any moment created in the right chain that might have urged counterclockwise rotation of the hitch ball socket about the hitch ball to thereby counteract the sway of the trailer to the left is cancelled by an equal and opposite moment created in the left chain.

Various mechanisms have been utilized by prior art weight-distributing hitches to allegedly control trailer sway. For example, U.S. Pat. No. 6,629,701 of Colibert teaches the use of a sway control adjustment control plate fixed to the bottom of the hitch head to control trailer sway.

For another example of a weight-distributing hitch for allegedly controlling trailer sway, see U.S. Pat. No. 5,984,341 to Kass et al., which teaches the use of friction pads, namely adding additional elements which are exposed to the elements and are inherently subjected to substantial wear, tear and contamination but, unfortunately, only minimally reduce swaying, if any, while also inhibiting the trailer from quickly and reliably returning to a non-sway equilibrium configuration.

As yet another example of a prior art weight-distributing hitch that allegedly controls trailer sway, see U.S. Pat. No. 6,419,257 to McCoy et al. which teaches the use of cams and cam followers for that purpose. During a sway to the left, the lateral offset of the pivoting trunnion of the left spring bar displaces the distal end of the left spring bar rearwardly which causes the concave-downwardly cam follower to ride upward onto the cam thereby increasing the tension in the chain of that lifting mechanism. Simultaneously therewith, the lateral offset of the pivoting trunnion of the right spring bar displaces the distal end of the right spring bar forwardly which causes that concave-downwardly cam follower to also ride upwardly onto its cam thereby also increasing the tension in the chain of that lifting mechanism. In other words, the increased tensioning in the opposing lifting mechanisms cancel out any anticipated moment for controlling trailer sway. Similar circumstances apply when the trailer sways to the right.

What is needed is a weight-distributing hitch that controls sway by increasing tension in a spring bar disposed toward the outside of a sway while simultaneously decreasing tension in an opposing spring bar disposed toward the inside of the sway so the changes in the tensions of the opposing spring bars cooperatively and dynamically create moments which counteract swaying of the trailer by returning the trailer to an equilibrium configuration where the trailer is again aligned with the towing vehicle.

What is also needed is such a weight-distributing hitch that can also control sway without requiring any additional parts, such as sway control plates fastened to the hitch head, friction pads, cams and cam followers, etc., particularly since the amount of access generally available for weight-distributing hitches is very limited due to the minimal available space on the trailer tongue sometimes being needed for other purposes, such as cover plates, propane tanks, tool boxes, and other necessary equipment.

SUMMARY OF THE INVENTION

The improvements of the present invention for an anti-sway, tongue-weight equalizing hitch for a trailer having a hitch ball socket mounted on a tongue thereof include a forwardly-extending shank structured to be releasably connectable to a hitch arrangement of a towing vehicle; a hitch head secured to the shank and having a longitudinal axis; an elevating mechanism structured to adjust the elevation of the hitch head relative to the elevation of the trailer tongue; a leveling mechanism structured to adjust the tow axis to be vertically-oriented; opposing and rearwardly-extending right and left spring bars; and right and left suspension mechanisms.

The hitch head includes a hitch ball having a tow axis positioned on the longitudinal axis wherein the hitch ball is adapted to mate with the hitch ball socket of the trailer such that the hitch ball socket pivots about the tow axis.

Each right and left spring bar includes a distal end and a proximal end, with each distal end mounted to the hitch head to pivot about a respective right or left stabilizing axis wherein the right and left stabilizing axes are disposed in respective opposing vertically-oriented pivot axis planes spaced laterally and equidistantly outwardly from the longitudinal axis with each right and left stabilizing axis tilted rearwardly from a vertical orientation.

The right suspension mechanism includes a connector structured to suspend the distal end of the right spring bar from a rail along the right side of the trailer, and the left suspension mechanism includes a connector structured to suspend the distal end of the left spring bar from a rail along the left side of the trailer The distal ends of the spring bars are normally spaced laterally and equidistantly outwardly from the respective vertical-oriented pivot axis planes of the right and left stabilizing axes in an equilibrium configuration.

The right and left spring bars are pivotally mounted to the hitch head wherein a sway to the left of the trailer causes tension in the right connector to be increased and causes tension in the left connector to be decreased, and a sway of the trailer to the right causes tension in the left connector to be increased and causes tension in the right connector to be decreased.

PRINCIPAL OBJECTS AND ADVANTAGES OF THE INVENTION

The principal objects and advantages of the present invention include: providing a weight-distributing hitch that controls sway by increasing tension in one tensioning mechanism disposed toward the outside of a sway while simultaneously decreasing tension in an opposing tensioning mechanism disposed toward the inside of the sway so the changes in the tensions applied by the opposing tensioning mechanisms cooperatively counteract swaying of the trailer; providing such a weight-distributing hitch that controls sway without requiring any additional parts; providing such a weight-distributing hitch that includes an elevating device that enables leveling of a tongue of a trailer to be towed relative to the desired height of a hitch arrangement of the towing vehicle; providing such a weight-distributing hitch that enables a user to adjust the axis of a hitch ball thereof to a vertical orientation; and generally providing such a weight-distributing trailer hitch that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWING FIGURES

DETAILED DESCRIPTION OF THE INVENTION

Figure 1:
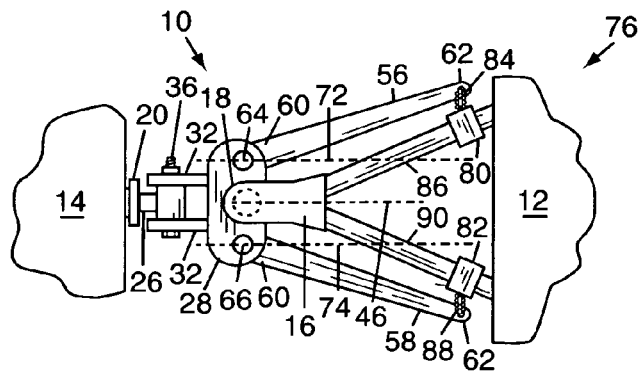
FIG. 1 is a plan view of a dynamic anti-sway, tongue weight-equalizing trailer hitch, according to the present invention.

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a tongue weight-equalizing hitch apparatus for dynamically controlling sway of a trailer 12 being pulled behind a towing vehicle 14 according to the present invention as shown in FIGS. 1 through 4, wherein the trailer 12 includes a tongue 16 with a hitch ball socket 18 secured thereto, and the towing vehicle 14 includes a hitch arrangement, such as a conventional receiver hitch 20, secured to the rear end thereof.

Figure 2:
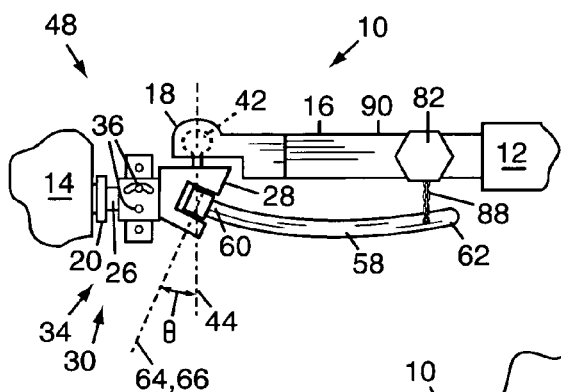
FIG. 2 is a left side elevational view of the dynamic anti-sway, tongue weight-equalizing trailer hitch as shown in FIG. 1.
Figure 3:
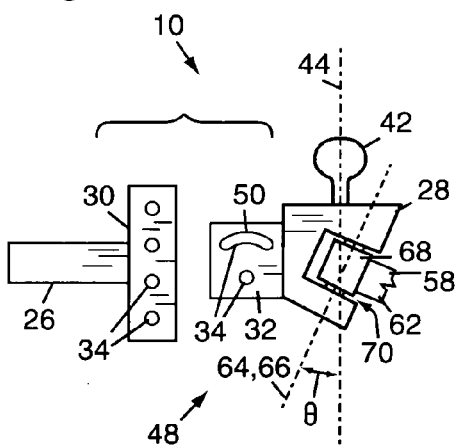
FIG. 3 is an enlarged and fragmentary, left side elevational view of an elevating mechanism and a leveling mechanism of the dynamic anti-sway, tongue weight-equalizing trailer hitch.

The hitch apparatus 10 includes a forwardly-extending hitch shank 26 structured to be releasably connectable to the conventional receiver hitch 20 of the towing vehicle. The hitch apparatus 10 includes a hitch head 28 secured to the hitch shank 26 by an elevating mechanism 30. For example, the elevating mechanism 30 may include a pair of opposing vertically-oriented shank-mounting members 32 fixedly secured to the hitch head 28, as shown in FIGS. 1 through 3. Each of the shank-mounting members 32 includes a series of aligned orifices 34 wherein a pair of fasteners 36, such as bolts and nuts, may be inserted through orifices 34 to thereby select a desired elevation of the hitch head 28 relative to the elevation of the trailer tongue 16.

The hitch head 28 also includes a hitch ball 42 fixedly secured thereto wherein a tow axis 44 of the hitch ball 42 is spaced along a longitudinal axis 46 of the hitch head 28. The hitch ball 42 is structured to releasably mate with the hitch ball socket 18 of the trailer wherein the hitch ball socket 18 pivots about the tow axis 44.

The hitch head 28 also includes a leveling mechanism 48 which enables a user to adjust the hitch head 28 such that the tow axis 44 is vertically-oriented. For example, orifice 50 of the orifices 34 through the shank-mounting members 32 may be an arcuate slot 50 as shown in FIG. 3, which enables a user to pivot the hitch head 28 about a transverse horizontal axis relative to the hitch shank 26 to thereby provide the tow axis 44 with the desired vertical orientation when the fasteners 36 through orifices 34 and the arcuate slot 50 are secured.

The hitch apparatus 10 also includes opposing right and left rearwardly-extending spring bars 56, 58 wherein each spring bar includes a proximal end 60 and a distal end 62. The distal ends 62 of the right and left spring bars 56, 58 are pivotally connected to the hitch head 28 to respectively pivot about right and left stabilizing pivot axis 64, 66. For example, each distal end 62 of the right and left spring bars 56, 58 may include a trunnion 68 journalled around a post or axle 70, as shown in FIG. 3. The stabilizing pivot axes 64, 66 lie in respective opposing vertically-oriented pivot axis planes 72, 74 which are laterally offset from each other equidistantly outwardly from the longitudinal axis 46 of the hitch head 28 when the hitch apparatus 10 is in an equilibrium configuration 76 as shown in FIG. 1.

Each of the stabilizing pivot axes 64, 66 are tilted rearwardly at an angle, $\theta$, relative to the vertically-oriented tow axis 44, as shown in FIGS. 2 and 3. It is extremely important to note that the stabilizing pivot axes 64, 66 are tilted substantially angularly and rearwardly relative to the vertically-oriented tow axis 44 as hereinafter described which is separate and apart from, and not to be confused with, the tilting/leveling of the hitch head 28 by the leveling mechanism 48. The identical rearward tilts, $\theta$, of the stabilizing pivot axes 64, 66 lie in the range of approximately 8° from vertical to approximately 15° from vertical, preferably 11° from vertical.

The hitch apparatus 10 further includes right and left tensioning mechanisms 80, 82 as described in U.S. application Ser. No. 12/386,201 to Goodman et al. and entitled "Side-Mountable Chain-Tensioning Device for a Load-Compensating Trailer Hitch", which application is incorporated herein by reference in its entirety. The right tensioning mechanism 80 includes a downwardly-depending connector 84, such as a cable or chain for example, which is structured to releasably secure the distal end 62 of the right spring bar 56 to the right tongue rail 86 along the right side of the trailer, and the left tensioning mechanism 82 similarly has a downwardly-depending connector 88 which is structured to releasably secure the distal end 62 of the left spring bar 58 to the left tongue rail 90 along the left side of the trailer.

In an application of the present invention, the towing vehicle is aligned straightaway from the trailer. The hitch shank 26 is inserted into the conventional receiver hitch 20 of the towing vehicle, and the hitch ball socket 18 of the trailer is mounted on the hitch ball 42. The elevating mechanism 30 and the leveling mechanism 48 are adjusted to appropriately elevate the trailer tongue 16 relative to the conventional receiver hitch 20 and to adjust the tow axis 44 of the hitch ball 42 to be vertically-oriented.

Each tensioning mechanism 80, 82 is secured to the respective right or left rail 86, 90 of the trailer tongue 16 above the distal end 62 of the respective right or left spring bar 56, 58.

The tensioning mechanisms 80, 82 are adjusted to increase upward tension in connectors 84, 88 until the tensions in the connectors 84, 88 are substantially equal and the tongue weight is approximately evenly distributed between the front wheels and the rear wheels of the towing vehicle. The distal ends 62 of spring bars 56, 58 should then be laterally offset from each other and spaced equidistantly outwardly from their respective vertical pivot axis planes 72, 74, the equilibrium configuration 76 shown in FIG. 1. Applying tension to the right and left connectors 84, 99 may require that the elevating mechanism 30 and the leveling mechanism 48 be tuned to reestablish the desired levelness between the hitch arrangement of the towing vehicle and the trailer tongue, and to reestablish vertical orientation of the tow axis 44.

Figure 4:
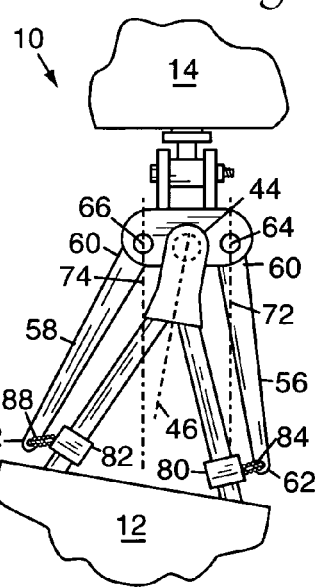
FIG. 4 is a schematic representation of the dynamic anti-sway, tongue weight-equalizing trailer hitch wherein a trailer being towed by a towing vehicle is swaying to the left as viewed from above, according to the present invention.

As the towing vehicle is towing the trailer wherein the trailer sways to the left, as schematically shown in FIG. 4, the hitch ball socket 18 of the trailer pivots clockwise about tow axis 44 relative to the hitch ball 42, and spring bars 56, 58 pivot clockwise about their respective tilted stabilizing pivot axes 64, 66. As a result, the sway to the left and lateral offset of the proximal end 60 of the right spring bar causes two changes to occur with respect to the right spring bar 56. First, the distal end 62 of the right spring bar 56, which is disposed toward the outside of the sway, is displaced forwardly relative to the trailer and, second, the distal end 62 of the right spring bar 56 is displaced toward the right pivot axis plane 72 which, due to the rearward tilt of pivot axis 64, increases the tension in the right connector 84.

Simultaneously therewith, the sway to the left and the lateral offset of the proximal end 60 of the left spring bar 58 also causes two changes to occur with respect to the left spring bar 58. First, the distal end 62 of the left spring bar 58, which is disposed toward the inside of the sway, is displaced rearwardly relative to the trailer and, second, the distal end 62 of the left spring bar 58 is displaced away from the left pivot axis plane 74 which, due to the rearward tilt of pivot axis 66, decreases the tension in connector 88. The increase in the tension of the right connector 84 cooperatively with the decrease in the tension of the left connector 88 imparts a reliable and positive counterclockwise anti-sway moment about tow axis 44, the horizontal component of which urges spring bars 56, 58 to return to the equilibrium configuration 76 whereat the tensions in connectors 84, 88 will again be equalized and the anti-sway moment vanishes.

Analogous reasoning applies during a sway to the right wherein tension in connector 88 is increased as tension in connector 84 is decreased which cooperatively and dynamically imparts a reliable and positive clockwise anti-sway moment about tow axis 44 until the spring bars 56, 58 return to the equilibrium configuration 76 whereat the tensions in connectors 84, 88 are again equalized and the anti-sway moment vanishes.

It should be noted that during a sway, the closer the distal end of the spring bar, which disposed toward the outside of the sway, approaches its pivot axis plane and the farther the distal end of the spring bar, which is disposed toward the inside of the sway, is displaced away from its pivot axis plane, the greater is the anti-sway moment which is imparted that urges the spring bars back to the equilibrium configuration. Stated another way: the greater the sway, the greater the anti-sway torque.

It is to be understood that while certain forms of the present invention have been illustrated and described herein, it is not to be limited to the specific forms or arrangement of parts as described and shown.

What is claimed and desired to be covered by Letters Patent is as follows:

1. An anti-sway, tongue-weight equalizing hitch for a trailer having a hitch ball socket mounted on a tongue thereof, the anti-sway hitch comprising:
   (a) a forwardly-extending shank structured to be releasably connectable to a hitch arrangement of a towing vehicle;
   (b) a hitch head secured to the shank and having a longitudinal axis, the hitch head including a hitch ball having a tow axis positioned on the longitudinal axis wherein the hitch ball is adapted to mate with a hitch ball socket of the trailer wherein the hitch ball socket pivots about the tow axis;
   (c) opposing and rearwardly-extending right and left spring bars wherein each spring bar includes a proximal end, which is mounted to the hitch head to pivot about a respective right or left stabilizing axis, and a distal end; the right and left stabilizing axes being disposed in respective opposing vertical pivot axis planes spaced laterally outwardly from the longitudinal axis wherein the top of each right and left stabilizing axis is tilted at least 8° rearwardly; and
   (d) right and left suspension mechanisms, the right suspension mechanism including a connector structured to suspend the distal end of the right bar from a rail along the right side of the trailer, and the left suspension mechanism including a connector structured to suspend the distal end of the left spring bar from a rail along the left side of the trailer, wherein the distal ends of the spring bars are normally spaced laterally and equidistantly outwardly from their respective vertical pivot axis planes when the trailer is aligned with the towing vehicle;
   (e) wherein, in use:
      (1) a sway of the trailer to the left of the towing vehicle causes tension in the right connector to be increased and causes tension in the left connector to be decreased thereby creating a moment about the tow axis which causes the trailer to dynamically return to alignment with the towing vehicle whereat the moments created by the sway about the tow axis vanishes, and
      (2) a sway of the trailer to the right causes tension in the left connector to be increased and causes tension in the right connector to be decreased thereby creating a moment about the tow axis which causes the trailer to dynamically return to alignment with the towing vehicle whereat the moments created by the sway about the tow axis vanishes.

2. An anti-sway, tongue-weight equalizing hitch as described in claim 1, wherein each of the right and left stabilizing axes tilt 8° to 15° rearwardly from a vertical orientation.

3. An anti-sway, tongue-weight equalizing hitch as described in claim 1, wherein each of the right and left stabilizing axes tilt 11° rearwardly from a vertical orientation.

4. An anti-sway, tongue-weight equalizing hitch as described in claim 1, the stabilizing axes and the right and left spring bars being structured wherein:
   (a) a sway of the trailer to the left causes tension in the right connector to be increased and causes tension in the left connector to be decreased, and
   (b) a sway of the trailer to the right causes tension in the left connector to be increased and causes tension in the right connector to be decreased.

* * * * *